April 5, 1938.  V. D. LANDON ET AL  2,113,157

COIL SYSTEM FOR MULTIPLE RANGE RADIO RECEIVERS AND THE LIKE

Filed Jan. 31, 1936

INVENTORS
Vernon D. Landon
William H. Conron

BY

ATTORNEY

Patented Apr. 5, 1938

2,113,157

UNITED STATES PATENT OFFICE 2,113,157

COIL SYSTEM FOR MULTIPLE RANGE RADIO RECEIVERS AND THE LIKE

Vernon D. Landon, Collingswood, and William H. Conron, Haddonfield, N. J., assignors to Radio Corporation of America, a corporation of Delaware Application January 31, 1936, Serial No. 61,778

9 Claims. (Cl. 250—40)

The present invention relates to coil systems for multiple range radio receivers and the like, and has for its object to provide an improved system of that character whereby a minimum number of coils or windings are provided to tune a plurality of circuits over differing frequency ranges or wave bands.

A further object of the present invention is to provide an improved and simplified coil system for multiple frequency range high frequency circuits such as are used in multiple range radio receivers and the like.

It is a still further object of the present invention to provide an improved coil system for tuned high frequency circuits whereby the same may be tuned through a plurality of differing frequency ranges and adjusted for operation in any selected range by simple switching means.

It is also an object of the present invention to provide an improved and simplified multiple range tuning and coupling means for high frequency circuits.

The invention will, however, be better understood from the following description when considered in connection with the accompanying drawing and its scope will be pointed out in the appended claims.

Figure 1:
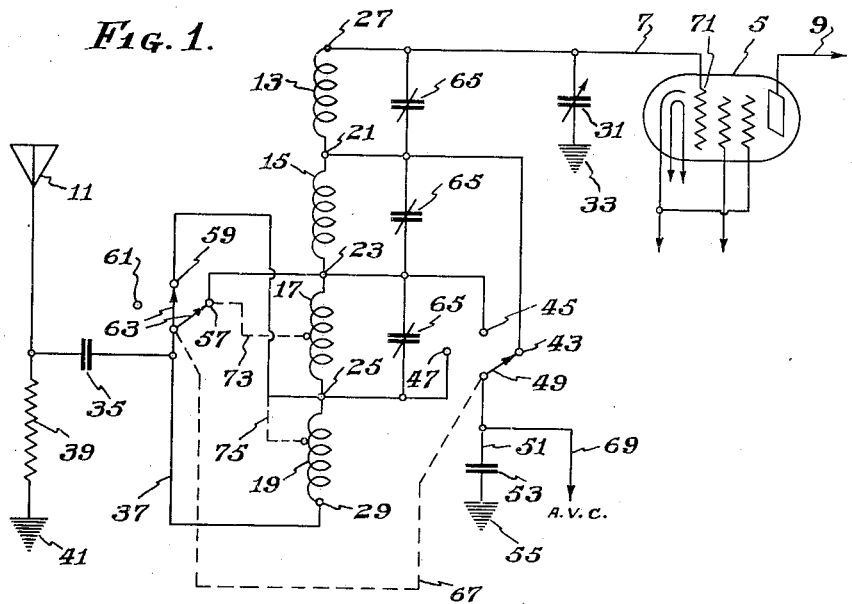
Figure 2:
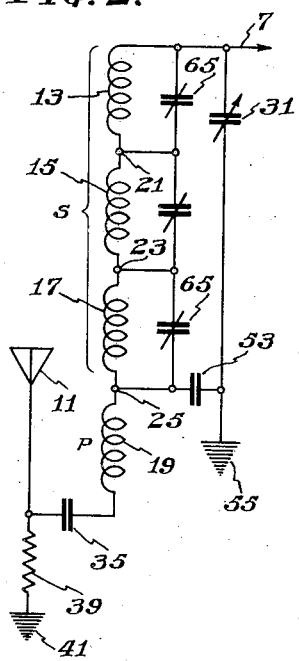
Figure 3:
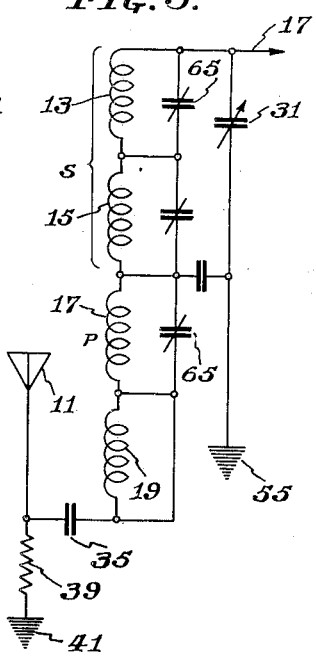
Figure 4:
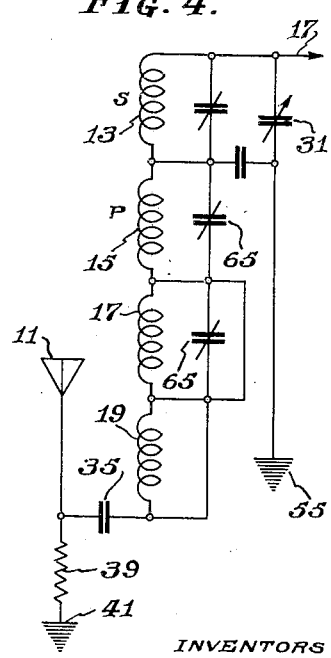

In the drawing, Figure 1 is a schematic circuit diagram of a coil system embodying the invention, for coupling two high frequency circuits, and Figs. 2, 3 and 4 are similar schematic circuit diagrams illustrating the circuit connections provided by the circuit of Fig. 1 when adjusted for operating in each of several different frequency ranges or wave bands.

Referring to Fig. 1, 5 is an electric discharge amplifier device or tube to which is connected a grid circuit represented by the lead 7 and an anode circuit represented by the lead 9. The device 5 represents any high frequency device having an input circuit to which it is desired to couple a preceding circuit for conveying signals thereto at high frequencies in a plurality of frequencies or wave bands and, in the present example, represents the radio frequency amplifier tube of a radio receiving system to which it is desired to couple a signal source such as an antenna 11.

In accordance with the invention, the coupling between the antenna and the tube 5 is accomplished through a single coil system providing a tunable coupling transformer, the single winding of which is tapped at intervals, or arranged to provide a plurality of coaxial sections as indicated, for example, at 13, 15, 17 and 19. The coil system may comprise a continuous winding sectionalized by suitable intermediary taps 21, 23 and 25 between the terminal ends indicated at 27 and 29.

The single winding is utilized as a coupling transformer by connecting an input circuit, for example from the antenna, to one end of the coil winding 29, while the opposite end 27 is connected to a secondary or output circuit, which, in this case, is the grid circuit represented by the lead 7 for the amplifier tube 5. Suitable simplified switching means are provided for connecting the ground or low potential side of the input and output circuits progressively along the winding from the input end to the output end followed by a simplified short-circuiting means, whereby unusual portions of the winding remain in circuit but are short-circuited progressively, following the grounding or progressive tapping operation.

In the present example, the input or grid lead 7 is connected to the terminal 27 and to a variable tuning capacitor 31 which, in turn, is connected to the low potential side of the input and output connection, represented by a ground connection 33. The antenna is coupled to the terminal 29 at the opposite end of the winding through a coupling capacitor 35 and a lead 37. Signals from the antenna are applied across a coupling resistor 39 connected between the antenna and the low potential side of the input and output circuits for the coil system represented by the ground connection 41.

The intermediate taps 21, 23 and 25 are connected respectively to contact points 43, 45 and 47 respectively, of a wave band selector switch, the contact arm 49 of which is connected through a lead 51 and a capacitor 53 with the low potential side of the input and output system hereinbefore referred to and represented by the ground connection 55.

The capacitor 53 is of relatively low impedance to signals at all frequencies within the various tuning ranges to be covered by the tuning system and, with this arrangement, it will be seen that if the contact arm 49 is adjusted from the contact 47 progressively to the contact 45 and into the position shown, a low impedance path will be provided to ground or the low side of the system progressively from a point more adjacent to the input terminal, to a point more adjacent to the output terminal, thereby including in circuit with the tuning capacitor 31 and in the output circuit of the coil system, a progressively reduced number of sections of the winding, whereby the output circuit is turnable progressively in high frequency ranges. The connection for the highest frequency range being shown in the present example.

At the same time, it will be seen that a larger number of sections of the winding are included between the input terminal 29 and the ground or return circuit connection for the input or antenna circuit. The coil arrangement, however, is such that each section may provide a primary winding for association with the windings in the output circuit as a secondary, which primary winding may resonate at approximately one half of the lowest frequency of the frequency range or wave band to be covered for each adjustment of the selector switch 49.

Accordingly, the coil sections other than that next adjacent to the sections comprising the secondary winding, for any adjustment, are short circuited by a similar simplified switching means comprising contacts 57, 59 and 61 over which a pair of spaced contact arms 63 are movable from the position shown, in the direction of the contact 61. The contact 59 is connected to the tap point 25, as shown, while the contact 57 is connected with the tap point 23.

With this arrangement, in the position shown, the coil sections 19 and 17 are short-circuited so that the antenna is coupled to the tap point 23. The coil 15 thereby constitutes a primary winding while the coil 13 constitutes a secondary winding, the two being electro-magnetically coupled by reason of their position in coaxial relation as part of a single winding or coil.

Each of the sections may be provided with an individual shunt trimmer capacitor as indicated at 65, whereby the tuning of each coil section may be adjusted in the secondary for the highest frequency response in that range, the main tuning capacitor 31 controlling the total range to be covered for any one adjustment.

In order that the unused sections of the coil system may progressively be short-circuited following the progressive adjustment of the low potential tap, the switches 49 and 63 may be interconnected by a mechanical connection as indicated by the dotted line 67.

It will be noted that the coil system is isolated from the ground or low potential side of the system by the capacitors 35 and 53 whereby biasing or controlling potentials may be applied through a lead 69 to the tube 5 through the coil system, as is desirable for automatic volume control purposes. In the present example, the input circuit 7 is connected to the signal or control grid 71 of the tube 5.

The antenna coupling capacitor 35 and coupling impedance or resistor 39 provide the added advantage that low audio frequency stray signals such as a 60 cycle hum signal picked up by the antenna or input circuit by the coil system is thereby prevented from reaching the grid 71 of the tube 5 since it may not pass readily through the relatively high audio frequency impedance of the coupling capacitor 35. For this reason, the antenna coupling capacitor 35 is of relatively low value sufficient, however, to provide relatively low impedance within the high frequency tuning range of the system while providing a relatively high impedance to signals within the audio frequency range.

Referring to Figs. 2, 3 and 4, the coil system of Fig. 1 is shown for the three positions of the switches 49 and 63 and the same reference numerals are, therefore, applied to the same parts therein. From a consideration of the figures referred to, it will be seen that as the switches are progressively moved from left to right as viewed in Fig. 1, the resulting connections are shown progressively by Figs. 2, 3 and 4 in that order, Fig. 4 representing the connections provided by the switches when in the positions shown in Fig. 1.

It will further be seen that, as the secondary portion of the coil system is increased, progressively to lower frequency ranges, the primary section for the preceding higher frequency range is utilized as a portion of the secondary of the next lower frequency range whereby the secondary is progressively increased in the number of sections therein and, through the medium of the short-circuiting switch, the primary is maintained in one section next adjacent to the section or sections comprising the secondary.

Stated in other words, the primary section is progressively changed along the coil or winding from a position adjacent to the secondary end, to a position at the input end, the short-circuit being also progressively moved toward the input end of the winding or coil system. This results in a much simplified winding and switch means and involves in effect, a single winding having taps thereon along which the low potential side of the input and output circuits is progressively connected, with the input and output circuits connected at the opposite ends of the coil system. The input and output circuit connections, that is, the high potential sides thereof are not broken or changed in connection with the coil system by the switching means but only the low potential sides thereof being moved or adjusted.

If it is desirable to increase the size of the primary winding for any wave band or frequency range, the same may be effected by changing the taps for the short-circuiting switch 63 as indicated by the dotted connections 73 and 75 of Fig. 1, as may be desirable for coupling the tube 5, for example, to other circuits.

We claim as our invention:

1. In a coupling system for high frequency circuits, the combination of a single adjustable coil comprising a continuous winding having taps thereon providing adjacent winding sections, and means for progressively connecting said sections serially in one circuit and means interconnected in predetermined operating relation with said first named means for maintaining the next adjacent winding section to the serially connected sections in a differing circuit from the serially connected winding sections.

2. In a coupling system for high frequency circuits, the combination with a high frequency input circuit and a high frequency output circuit, of a transformer coil system comprising a single winding, means providing intermediate taps thereon and a series of winding sections between said taps, means providing a connection for said output circuit at one end of said winding, means providing a connection for the input circuit at the opposite end of said winding, and means providing a low impedance path progressively adjustable and in connection with said taps common to said input and output circuits, whereby the number of winding sections included serially in the output circuit may be adjusted, and means interconnected for operation with said last named means for rendering effective in said input circuit a limited number of said sections exclusive of the output circuit.

3. In a multiple range radio receiving system, the combination with a signal input circuit and a signal output circuit, of a transformer winding comprising a series of coaxial winding sections serially connected between said input circuit and said output circuit, means common to said input and output circuits for progressively including in said output circuit a progressively increasing number of said winding sections, and means connected with said last named means for simultaneous operation therewith for connecting said input circuit progressively with a winding section next adjacent to and coupled with said serially connected sections in said output circuit.

4. In a coupling system for high frequency circuits, the combination with a high frequency input circuit and a high frequency output circuit, of a single coil having a plurality of sections, one end of said coil being fixedly connected to the output circuit and the opposite end being fixedly connected to the input circuit, means providing a low impedance connection between an intermediate tap on said coil common to both the input and output circuits, means for tuning said output circuit, means for tuning a plurality of said sections and single control means for conjointly adjusting said low impedance connection along said coil to vary the number of sections included in the output circuit and progressively rendering inactive the remainder of the coil in the input circuit except for a single one of said coil sections adjacent to and coupled with a coil in the output circuit.

5. In a coupling system for high frequency circuits, the combination with a high frequency input circuit and a high frequency output circuit, of means providing a single tunable winding comprising a plurality of sections, means for connecting said winding in the output circuit in sections progressively from one end thereof toward the other, means connected for operation with said last named means for connecting the input circuit with one section progressively toward said other end in advance of said first named connections, and means cooperatively connected with said connecting means for short circuiting the remainder of said winding in circuit with the input circuit and progressively removing the short circuit by sections toward said other end.

6. In a tuning system for multiple range, high frequency circuits, the combination of a secondary winding, a primary winding and a plurality of short circuited windings, arranged in the order named, in coaxial relation to each other whereby adjacent coils are electromagnetically coupled, means for progressively increasing the secondary to include the primary and certain of the short circuited windings, and means connected for operation with said last named means in predetermined relation therewith for simultaneously shifting the primary progressively from one short circuited section to another in advance of the increasing secondary and for progressively removing the short circuit from said sections in advance of the primary, whereby the secondary is separated from the short circuited portion of the winding system by the primary.

7. In a high frequency tuning system for multiple range radio receivers and the like, the combination of a high frequency input circuit, a high frequency output circuit, means providing a continuous winding arranged in sections, the output circuit being connected to one end thereof and the input circuit being connected to the opposite end thereof at the high potential side of each circuit, means providing a low impedance tap connection along said winding common to both input and output circuits whereby the number of winding sections in the output circuit are progressively varied, and means for progressively short circuiting certain of said winding sections to restrict the winding sections in the input circuit to a constant number, said last named means and said tap connection means being interconnected for simultaneous operation in predetermined relation to each other thereby to restrict said input circuit windings to a constant number.

8. A multiple wave tuning coil system comprising a plurality of winding sections, a primary circuit connected with at least one of said windings, a secondary circuit connected with at least one of said windings adjacent to said first named winding and switching means for progressively increasing the secondary in the number of sections included therein, whereby said secondary circuit is tunable through progressively lower frequency ranges, and said switching means including a connection element whereby the primary section of the next higher frequency range is progressively included in the secondary circuit of the next lower frequency range to the exclusion of the primary circuit.

9. In a coupling system for high frequency circuits, the combination with a high frequency primary circuit and a high frequency secondary circuit, of a transformer coil system comprising a single winding, means providing intermediate taps thereon and a series of winding sections between said taps, means providing a connection for said secondary circuit at one end of said winding, means providing a connection for the primary circuit at the opposite end of said winding, and means providing a low impedance path to ground progressively adjustable and in connection with said taps common to said primary and secondary circuits, whereby the number of winding sections included serially in the secondary circuit may be adjusted, and means interconnected for operation with said last named means for rendering effective in said primary circuit a limited number of said sections exclusive of the secondary circuit.

VERNON D. LANDON.
WILLIAM H. CONRON.